United States Patent
Schenk et al.

(10) Patent No.: US 6,361,830 B1
(45) Date of Patent: Mar. 26, 2002

(54) PROCESS FOR MANUFACTURING METAL SHEET GASKETS COATED WITH ELASTOMER

(75) Inventors: Peter Schenk, Hohenstein; Reinhold Buck, Huelben, both of (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 08/965,428

(22) Filed: Nov. 6, 1997

Related U.S. Application Data

(63) Continuation of application No. PCT/EP96/01867, filed on May 4, 1996.

(30) Foreign Application Priority Data

May 16, 1995 (DE) .......................................... 195 17 915

(51) Int. Cl.$^7$ ................................................. B05D 1/02
(52) U.S. Cl. ..................... 427/421; 427/221; 427/422; 427/290; 427/292
(58) Field of Search ................................. 427/358, 421, 427/221, 422, 424, 425, 426, 427, 289, 290, 292, 345

(56) References Cited

U.S. PATENT DOCUMENTS

| | | | | | |
|---|---|---|---|---|---|
| 3,770,480 A | * | 11/1973 | Farnam | ........................ | 117/4 |
| 4,169,185 A | * | 9/1979 | Bhatia | ........................ | 428/328 |
| 4,307,127 A | * | 12/1981 | Shah | ........................... | 427/27 |
| 4,538,542 A | * | 9/1985 | Kennon et al. | .............. | 118/302 |
| 4,620,995 A | * | 11/1986 | Otomo et al. | ................ | 427/409 |
| 5,004,650 A | * | 4/1991 | Ashizawa et al. | .......... | 427/409 |
| 5,415,717 A | * | 5/1995 | Perneborn | ................... | 427/197 |
| 5,532,026 A | * | 7/1996 | Jinno | ......................... | 427/409 |
| 5,582,864 A | * | 12/1996 | Kiser | ......................... | 427/186 |

FOREIGN PATENT DOCUMENTS

| | | | |
|---|---|---|---|
| DE | 30 18 074 A1 | * | 11/1981 |
| EP | 0 704 646 A2 | * | 4/1996 |
| JP | 62-255668 | * | 7/1987 |
| JP | 63-130967 | * | 3/1988 |

OTHER PUBLICATIONS

Kirk and Othmer, eds., Encyclopedia of Chemical Technology, 4th ed., vol. 4, pp. 1047–1054, 1992.*
Kirk and Othmer, eds., Encyclopedia of Chemical Technology, 4th ed., vol. 10, pp. 750–752, 1993.*

* cited by examiner

*Primary Examiner*—Shrive P. Beck
*Assistant Examiner*—Jennifer Calcagni

(57) ABSTRACT

In a process for manufacturing metal sheet gaskets coated with elastomer, as are often used as cylinder head gaskets or as compressor gaskets in refrigerant circuits, it is proposed that the elastomeric coating be applied to the individual metal sheet in a spray coating process in order to be able to carry out the coating with elastomer in a more cost-efficient manner.

21 Claims, No Drawings

PROCESS FOR MANUFACTURING METAL SHEET GASKETS COATED WITH ELASTOMER

This is a continuation of international PCT application No. PCT/EP96/01867 having international filing date of May 4, 1996, which designates the United States.

The invention relates to a process for manufacturing metal sheet gaskets coated with elastomer, as are often used as cylinder head gaskets or as compressor gaskets in refrigerant circuits.

To date, the coating of such metal sheet gaskets has been carried out by the metal sheetings being transported from roll to roll and having a continuous coating applied to them and by the corresponding gasket sheets then being punched out of the endless material and further processed to produce the finished gaskets.

The problem with this process is that the cut edges resulting from the punching remain uncoated and, therefore, a) are susceptible to corrosion, and
b) offer at the cut edge possible points of attack for liquids and gases which may cause the elastomeric coating on the surface of the metal sheets to become detached.

This problem was resolved in a different way of manufacturing metal sheet gaskets coated with elastomer wherein the metal sheets for the gaskets were first punched out of the endless material, and the punched-out sheets were coated with an elastomeric substance while passing through a curtain of liquid in a so-called flow coating process. The disadvantage of this way of manufacturing the metal sheet gaskets is that adjacent to edges of the gaskets, in particular, at openings such as, for example, combustion chamber edges of cylinder head gaskets or other passages for liquid in the gasket, and also at beads and shoulders, coating irregularities, for example, in the form of so-called runs or sags, occur on the underside of the sheets. The irregularities easily attain approximately the thickness of the desired coating and more, and so these negatively affect the function of the gasket. Furthermore, with this process, especially if the problem of the coating irregularities is to be kept within reasonable limits, only a relatively thin coating can be applied in one run, and so the coating has to be carried out several times if thicker coatings are desired. This involves not only a delay in the manufacture or manufacturing installations of correspondingly larger dimensions, but also additional operations, for example, if the accumulations of coatings were to cause such disturbances that they had to be eliminated by a separate punching operation. All of this negatively affects the cost factor in the manufacture of such known gaskets to a considerable extent.

A factor which is also not to be overlooked is the intermediate drying of the coating substances which is often necessary when several coats are applied.

The object of the present invention is to provide a process for the manufacture of metal sheet gaskets coated with elastomer wherein the coating with elastomer can be carried out with greater cost efficiency and avoidance of the above-mentioned disadvantages.

This object is accomplished in accordance with the invention in the process described at the outset by the elastomeric coating being applied to the individual metal sheet in a spray coating process.

Surprisingly, it has been found that the coating substances, although they have a distinctly higher viscosity than is usually the case in the spraying of paints, result in a problem-free way in a coating of the metal sheets of a metal sheet gasket with elastomer, in particular, using conventional spraying equipment, which is of excellent quality. Furthermore, with the spray coating technique, excessive accumulations of coatings on the underside of the sheets, in particular, at cut edges, beads or shoulders of the metal sheet layers, are avoided, and so additional machining such as, for example, subsequent punching to remove accumulations of coatings is dispensed with.

Furthermore, with the spray coating process a considerably larger layer thickness can be applied in one run than with the flow coating process used so far. In particular, an elastomeric coating with a layer thickness of distinctly more than 16 $\mu$m is possible with the inventive spray coating process. With this, there are no coating irregularities to impair the function of the gasket, and also a slight loading of the metal sheets with elastomer on the underside thereof due to spray mist has no disadvantageous consequences.

An elastomer coating operation is preferably carried out with a coating substance having a viscosity at approximately 23° C. of 10 to 120 seconds, preferably 30 to 90 seconds, efflux time with a 4 mm German Industrial Standard cup. On the one hand, these viscosities still allow good working with the spray coating technique, and, on the other hand, ensure that considerable layer thicknesses on the metal sheet, if desired, can be achieved in one run.

The equivalents in cps to the viscosity values given in seconds for the 4 mm standard up are:

| | |
|---|---|
| 10 seconds | 50 cps |
| 30 seconds | 145 cps |
| 90 seconds | 435 cps |
| 120 seconds | 580 cps |

Preferred elastomeric coatings which are manufactured in accordance with the inventive process have a layer thickness of 3 to 60 $\mu$m. It is to be noted that all these layer thicknesses can be applied in a single operation, i.e., in a single run, optionally with two directly successive coating procedures, by the spray coating apparatus.

The elastomer solutions used as coating substance can have a solids content of 5 to 40% by weight, with carbon black admixtures, fillers, auxiliary vulcanizing agents., etc. being understood as solids. It is important that the coating substance used for the elastomeric coating should include an elastomer solvent or solvent mixture so the elastomer is present in the substance in a dissolved form and not as a solid.

For easy handling of the spray coating process, in particular as regards the technical side of the installation, it is desirable for the solvent or solvent mixture to be recoverable. The solvent of the coating substances or the solvent mixture is preferably selected from elastomer-dissolving alcohols, aromatic compounds, esters and/or ketones having a boiling point in the range of 100 to 200° C. These solvents or solvent mixtures meet the requirements stated hereinabove.

Further preferred are solvents or solvent mixtures which include esters with boiling points in the range of 100 to 180° C., preferred up to approximately 150° C., and/or contain ketones with a boiling point in the range of 100 to 160° C., preferred up to approximately 120° C.

The inventive process can be carried out in a particularly economical way if the coating substance is recovered by the transport means with which the metal sheets are conveyed through the spray coating installation. This will often be a conveyor belt, and, in particular, one will recover the portions of the coating substance which pass through the combustion chamber openings in the metal sheets to the belt. This is possible in a particularly simple way by the pot life of the coating substance being adapted so as to be more than one hour.

In this way, only slight amounts of coating substance are lost in the coating of the metal sheets, and the process attains a particularly high cost efficiency.

The auxiliary vulcanizing agents referred to hereinabove are adapted to the overall system of the coating substance and are selected such that they are only activatable by thermal action or by high-energy rays so that a crosslinking of the cross-linkable elastomer systems is only achieved at the dry stage and so that pot lives of the elastomer solution of one hour and more are achievable.

The inventive process thus makes it possible to produce the necessary openings, beads, shoulders, etc. before the coating operation for with the spray coating it is ensured that no unacceptable accumulations of coatings will occur in these problem areas during the elastomer coating operation. This, furthermore, has the great advantage that the punched edges of the metal sheets are also coated with elastomer and, therefore, do not offer any points of attack for streams of lubricant, streams of coolant, etc., which can result in the elastomeric coating becoming detached from the metal sheet.

A coating substance which comprises per 100 parts by weight elastomer up to 150 parts by weight carbon black, up to 150 parts by weight fillers, up to 20 parts by weight crosslinkers, up to 50 parts by weight resins and 250 to 9500 parts by weight solvent or solvent mixture, and, optionally, up to 20 parts by weight auxiliary agents in the form of antioxidants, flow improvers, nonstick agents and accelerator additives is preferably used for the elastomeric coating.

The carbon black components are preferably added in the range of 20 to 80 parts by weight, and furnace blacks and thermal carbon blacks are preferably used, of these, in particular MT, FEF and HAF blacks, with the abbreviation MT standing for medium thermal, FEF for fast extruding furnace and HAF for high abrasion furnace.

As fillers, in particular calcium carbonate, calcium silicate, calcium metasilicate, mica, silicic acid, heavy spar, titanium dioxide, magnesium oxide, lead oxide, talc, kaolin, quartz and/or chlorite are suitable, with preferred filler amounts being 20 to 80 parts by weight.

As crosslinkers/auxiliary vulcanizing agents, 3 to 50 parts by weight are preferably used, and preferred crosslinkers/auxiliary vulcanizing agents are sulfur plus accelerator, crosslinker resins, aminic crosslinkers, bisphenolic crosslinkers, peroxides, triallyl isocyanurate, etc.

The resins referred to in the basic formula are preferably used within a range of 5 to 15 parts by weight and can comprise phenolic resins and epoxy resins.

The elastomer referred to several times hereinabove is preferably selected from NBR, FPM, AEM, ACM and/or EPDM, with, in particular, NBR and FPM being preferred, and with the abbreviation NBR standing for nitrile rubber, FPM for fluorinated rubber, AEM for ethylene-acrylate rubber, ACM for acrylate rubber and EPDM ethylene-propylene-diene rubber.

In order to optimize the recovery of coating substance, the completely punched and completely shaped metal sheets are transported on a conveyor belt with a closed surface through a coating station in which the elastomeric coating is applied in the spray coating process, and the portions of the coating substance which pass onto the conveyor belt surface, for example, through openings in the metal sheets, are removed from this and used again.

The invention will be explained in further detail in the following with reference to an example.

A coating substance with 20% solids content and a viscosity of 60 seconds (German Industrial Standard cup 4 mm; temperature 23° C.) is applied with standard spraying machines to a metal sheet completely punched out of sheet steel and provided with beads and shoulders, the sheet steel having been pretreated in the usual way (conventional degreasing by temperature treatment, plasma cleaning or alkaline degreasing; sandblasting, phosphating, zincing or etching; applying conventional adhesive). The composition of the formula of the coating substance was as follows:

| | |
|---|---|
| nitrile rubber (NBR) | 100 parts by weight |
| FEF black | 56 parts by weight |
| kaolin | 50 parts by weight |
| zinc oxide | 5 parts by weight |
| sulfur | 2.5 parts by weight |
| accelerator (conventional) | 2 parts by weight |
| phenolic resin | 12 parts by weight |
| solvent (ester/ketone mixture (boiling range 130 to 150° C.). | 910 parts by weight |

The pot life of the coating substance was 72 hours. The coating substance which passed onto the conveyor belt next to the metal sheet or through the metal sheet could be used again without any problem after supplementation by solvent constituents.

After the spray coating operation, the coated metal sheet was dried at 30–200° C. for 10 minutes and simultaneously cured. A temperature of 30° C. prevailed in the flash-off zone, whereas a temperature of 200° C. was reached in the furnace.

The coating thickness was 25 $\mu$m and this was attained in a single run. A subsequent testing of the metal sheet as component of the finished cylinder head gasket produced excellent test run results and, in particular, a very high service life of the gasket which is better than or comparable with a gasket manufactured with very high expenditure in a flow coating process and, in particular, reworked metal sheets.

What is claimed is:

1. Process for manufacturing a metal sheet gasket coated with elastomer, including the step of applying an elastomeric coating substance solely by way of spray coating to sheet metal, said coating substance including a solvent selected from the group consisting of an elastomer-dissolving alcohol, ester, except butyl acetate, ketone, and a solvent mixture comprising at least two of said elastomer-dissolving alcohol, ester, ketone, and an aromatic compound, wherein each said solvent has a boiling point in the range of 100 to 200° C.

2. Process as defined in claim 1, wherein said coating substance used for the elastomeric coating has at a temperature of 23° C. a viscosity of 50 cps to 580 cps.

3. Process as defined in claim 1, wherein said elastomeric coating is applied in a layer thickness of 3 to 60 $\mu$m through.

4. Process as defined in claim 1, wherein said coating substance used for the elastomeric coating has a solids content of 5 to 40% by weight.

5. Process as defined in claim 1, wherein said solvent is recovered.

6. Process as defined in claim 1 wherein the solvent comprises at least one of an ester with a boiling point in the range of 100 to 180° C. and ketone with a boiling point in the range of 100 to 160° C.

7. Process as defined in claim 1, wherein said coating substance used for the elastomeric coating has a pot life of $\geq$1 hour.

8. Process as defined in claim 1 wherein before the elastomeric coating is applied, the metal sheet is punched out in a required size and provided with an opening.

9. Process as defined in claim 1 wherein said coating substance comprises per 100 parts by weight elastomer up to 150 parts by weight carbon black up to 150 parts by weight filler up to 20 parts by weight crosslinker up to 50 parts by weight resin and 250 to 9500 parts by weight solvent.

10. Process as defined in claim 9, wherein said carbon black is selected from the group consisting of furnace blacks and thermal blacks including medium thermal blacks, fast extruding furnace blacks, and high abrasion furnace blacks.

11. Process as defined in claim 9 wherein calcium carbonate, calcium silicate, calcium metasilicate, mica, silicic acid, heavy spar, titanium dioxide, magnesium oxide, lead oxide, talc, kaolin, quartz, chlorites and mixtures thereof are used as fillers.

12. Process as defined in claim 9, wherein said crosslinker is present with 3 to 15 parts by weight in the coating substance, and in that the crosslinker is selected from the group consisting of sulfur plus accelerator, crosslinker resins, crosslinker containing amino groups, bisphenolic crosslinker, peroxides and triallyl isocyanurate.

13. Process as defined in claim 9 wherein said resin is present with a weight content of 5 to 30 parts by weight and comprise at least one of phenolic resin and epoxy resin.

14. Process as defined in claim 1 wherein at least one of nitrile rubber, fluorinated rubber, ethylene-acrylate rubber, acrylate rubber and ethylene-propylene-diene rubber is present individually or in a mixture as the elastomer in the coating substance.

15. Process as defined in claim 1, wherein after complete punching metal sheets are transported on a conveyor device through a coating station in which the elastomeric coating is applied in a spray coating process, and wherein portions of the overspray of the coating substance which pass onto a closed conveyor belt surface are removed from this surface by a recovery device and reused.

16. Process as defined in claim 6 wherein said ester has boiling point up to approximately 150 degrees C.

17. Process as defined in claim 6 wherein said ketone has boiling point up to approximately 120 degrees C.

18. Process as defined in claim 10 wherein the proportion of carbon black is 20 to 80 parts by weight per 100 parts by weight elastomer.

19. Process as defined in claim 11 wherein the fillers are present in a range of 20 to 80 parts by weight per 100 parts by weight elastomer.

20. Process for manufacturing a metal sheet gasket coated with elastomer, including the steps of punching a metal sheet to have a punched region with a cut edge and an unpunched region prior to coating with an elastomer and then applying an elastomeric coating substance to the cut edge of the punched region and to the unpunched region of the metal sheet solely by way of spray coating, said coating substance including a solvent selected from the group consisting of an elastomer-dissolving alcohol, ester, except butyl acetate, ketone, and a solvent mixture comprising at least two of said elastomer-dissolving alcohol, ester, ketone, and an aromatic compound, wherein each said solvent has a boiling point in the range of 100 to 200 degrees °C.

21. Process for manufacturing a metal sheet gasket coated with elastomer, including the step of applying an elastomeric coating substance solely by way of spray coating to sheet metal and to a cut edge of the sheet metal, said coating substance including a solvent selected from the group consisting of an elastomer-dissolving alcohol, ester, except butyl acetate, ketone, and a solvent mixture thereof comprising at least two of said elastomer-dissolving alcohol, ester, ketone, and an aromatic compound, wherein each said solvent has a boiling point in the range of 100 to 200° C.

* * * * *

UNITED STATES PATENT AND TRADEMARK OFFICE
CERTIFICATE OF CORRECTION

PATENT NO.    : 6,361,830 B1
DATED         : March 26, 2002
INVENTOR(S)   : Peter Schenk et al.

It is certified that error appears in the above-identified patent and that said Letters Patent is hereby corrected as shown below:

<u>Column 4,</u>
Line 55, delete "through".

<u>Column 6,</u>
Line 1, delete "the" (first occurrence).

Signed and Sealed this

Seventeenth Day of September, 2002

Attest:

JAMES E. ROGAN
Attesting Officer
Director of the United States Patent and Trademark Office